United States Patent [19]

Upton

[11] 4,153,946
[45] May 8, 1979

[54] EXPANDABLE SELECTION AND MEMORY NETWORK

[76] Inventor: Howard T. Upton, 2301 Glenallen Ave., Apt. 810, Silver Spring, Md. 20906

[21] Appl. No.: 844,046

[22] Filed: Oct. 20, 1977

[51] Int. Cl.$^2$ .......................... G06F 7/04; G06K 9/00
[52] U.S. Cl. .......................... 364/900; 340/146.3 MA
[58] Field of Search ... 364/200 MS File, 900 MS File; 365/49; 340/146.3 Q, 146.3 T, 146.3 MA

[56] References Cited

U.S. PATENT DOCUMENTS 3,906,446  9/1975  Iijima ........................ 340/146.3 MA Primary Examiner—James D. Thomas
Attorney, Agent, or Firm—Larson, Taylor and Hinds

[57] ABSTRACT

An evaluation circuit is depicted for evaluating the overall group similarity between a plurality of first signals with a plurality of second signals and for producing a signal based on the level of similarity or dissimilarity. Such an evaluation circuit includes a plurality of operator circuits each of which compares corresponding ones of the first and second signals and which outputs the result of that comparison to a single summary function circuit. The summary function circuit produces an output signal that corresponds to a weighted summary of the comparison results. Finally, a comparitor circuit compares the output from the summary function circuit with a criterion signal and, depending upon the desired degree of similarity produces a binary output signal whose value is based on the magnitude of the summary function output signal being greater than the magnitude of the criterion signal.

The evaluation circuit can be used to determine the similarity of the input signal to a stored signal and if the comparison is favorable to output the input signals. The evaluation circuit can also be used for storing a plurality of input signals depending upon the results of a comparison of those signals with a stored signal.

18 Claims, 6 Drawing Figures

EXPANDABLE SELECTION AND MEMORY NETWORK

FIELD OF THE INVENTION

The present invention relates in general to a method and means for automatically analyzing a plurality of input variables. More particularly, the present invention relates to a method and an electronic circuit and a network of similar such circuits for evaluating the similarity between a plurality of inputs and a plurality of standard values by using different selectable criteria.

BACKGROUND OF THE INVENTION

The task of analyzing very complex matrices of a plurality of variables and producing associative or predictive data in response thereto, essentially a task of pattern recognition and association, has proven extremely difficult for conventional electronic processing and storage techniques. Nevertheless, living organisms seem to perform this function easily. The present state of the art, as known and appreciated, appears to be characterized by numerous, common deficiencies. There is a lack of an efficient method for recognizing simple patterns over a wide range of scale, position, and form. There is also a lack of an efficient process for referencing a large body of stored data in order to determine how a present pattern of variables relates to previously received and stored patterns. There also appears to be a dependance on highly structured and organized integrated circuit networks that are susceptible to random manufacturing defects.

The commonly proposed approaches for selection or recognition of a pattern of values can apparently be characterized as pattern classification networks of the fixed type or of the adaptive type. The fixed, or "electronic template" pattern recognition network is generally able only to classify each area of a large field of data according to the resemblance of the data to a fixed "template" of circuit parameters using a fixed criterion or threshold level that is determined by the circuit design. An example of a template network is depicted in the Clapper U.S. Pat. No. 3,539,994. The adaptive network, on the other hand, is a self organizing or "learning" network which produces distinct outputs or resultants in response to different patterns and which, after sufficient repetition, is able to recognize a particular pattern. Adaptive networks of the prior art, such as depicted in U.S. Pat. Nos. 3,287,649 to Rosenblatt; 3,165,644 to Clapper; 3,103,648 to Hartmanis; and 3,273,125 to Jakowatz, show a degree of flexibility in the classification process. However, these networks generally require long "training periods" and are still primarily classification devices, capable of performing no other function.

SUMMARY OF THE INVENTION

The apparatus and method pursuant to the present invention provides complete flexibility of the parameters governing classification, while still providing externally controlled and defined operation. The data selection and memory functions of the present invention permit it to be used as the basic component of a complete associative data processing system, with associative data routing and associative memory storage/recall. The present invention is capable of processing sequentially applied data or data applied in parallel groups and can perform selection of a plurality of values from among any number of such pluralities based on the evaluation of the inputted data.

In particular it should be noted that the present invention only superficially resembles some of the prior art devices. For example, in regard to the Jakowatz and Hartmanis patents, the networks disclosed therein include means for relating two sets of signals and producing a summary output. However, the underlying theory behind these networks proceeds from a relatively old and well known theory about the type of information which should be processed or recognized by a recognition network and this theory is different from that of the present invention. In the Hartmanis and Jakowatz patents, the pattern of information that is recognized by the respective networks consists solely of the physical distribution of active signals over a set of lines. It is this distribution which is evaluated for its similarity with past experience. In the present invention, however, it is not the distribution of signal activity which is evaluated but the quantitative similarity between the two input signal levels. Thus, the present invention requires a comparison of the two input signals. All signal levels in the Hartmanis patent represent not information to be recognized but the "confidence level" of a detection process in which an input caused the network to go active. This process is thus a measure of how much trust or emphasis should be accorded the input signal in a recognition process. It is this premise of the approaches of the Hartmanis and Jakowatz patents which makes it necessary to utilize a multiplier element to combine input and stored values. It is the intention of Hartmanis to produce through this multiplication a signal which reflects the concurrence as well as the confidence level of the input and reference signals. On the other hand, in one embodiment of the present invention, an absolute difference operator is employed to yield a quantitative comparison, rather then a product of signal strengths.

The present invention also overcomes the disadvantages of the template and adaptive types of recognition networks. In particular, the present invention is not limited to an inflexible and highly specific selection process. The same basic circuitry or method of the present invention can be used for each category to be recognized, thereby alleviating the necessity of having a separate template for each category. One element of the present invention may be controlled by a data processing system to recognize a theoretically infinite number of categories. Another significant advantage of the present invention is the ability of the basic circuitry and method, when combined with a means of memory storage, to provide a novel content/criterion addressable memory element.

It is therefore an object of the present invention to provide a means for the selection of certain data from among a large body of data, according to flexible criteria for similarity between the selected data and some externally supplied reference data.

It is a further object of the present invention to provide a memory network which can store a number of elements of input data and, at some future time, selectively output or alter the single element of this data which most closely resembles some externally supplied reference or input data. This selective output or alteration can be accomplished according to a flexible set of criteria for similarity between the stored and the reference or input data.

Another object of the present invention is to provide a large memory network which can be manufactured as an integrated circuit and which will display a high tolerance for random defects and failure among the individual elements as a result of the individual elements being connected in parallel.

An additional object of the present invention is to provide a memory network which can perform the selective read/write process in response to an external reference or input supplied in several temporally sequential parts.

According to one embodiment, the present invention comprises a circuit element that can be combined with a plurality of identical circuit elements to form a network, each element comprising first and second reference and first and second variable input means for inputting corresponding reference and variable signals and a first and second operator means respectively coupled to the input means for comparing the reference signal with the variable signal and outputting the result of that comparison. A summary function means is coupled to the output of the first and second operator means for receiving the corresponding comparison results and for producing an output signal that corresponds to a weighted summary of the comparison results. The magnitude of the summary function output signal is compared in a comparitor means with the magnitude of a criterion signal, the magnitude of which depends upon the desired degree of similarity. The comparator means produces a binary output signal which can be a binary 1 or a binary 0 depending upon the logic used, if the magnitude of the summary fraction output signal is greater than the magnitude of the criterion signal.

Other details, features and objects of the present invention will be set forth in, or apparent from, the accompanying drawings and detailed description of the preferred embodiments found hereinbelow.

DETAILED DESCRIPTION OF THE PREFERRED EMBODIMENTS

Figure 1:
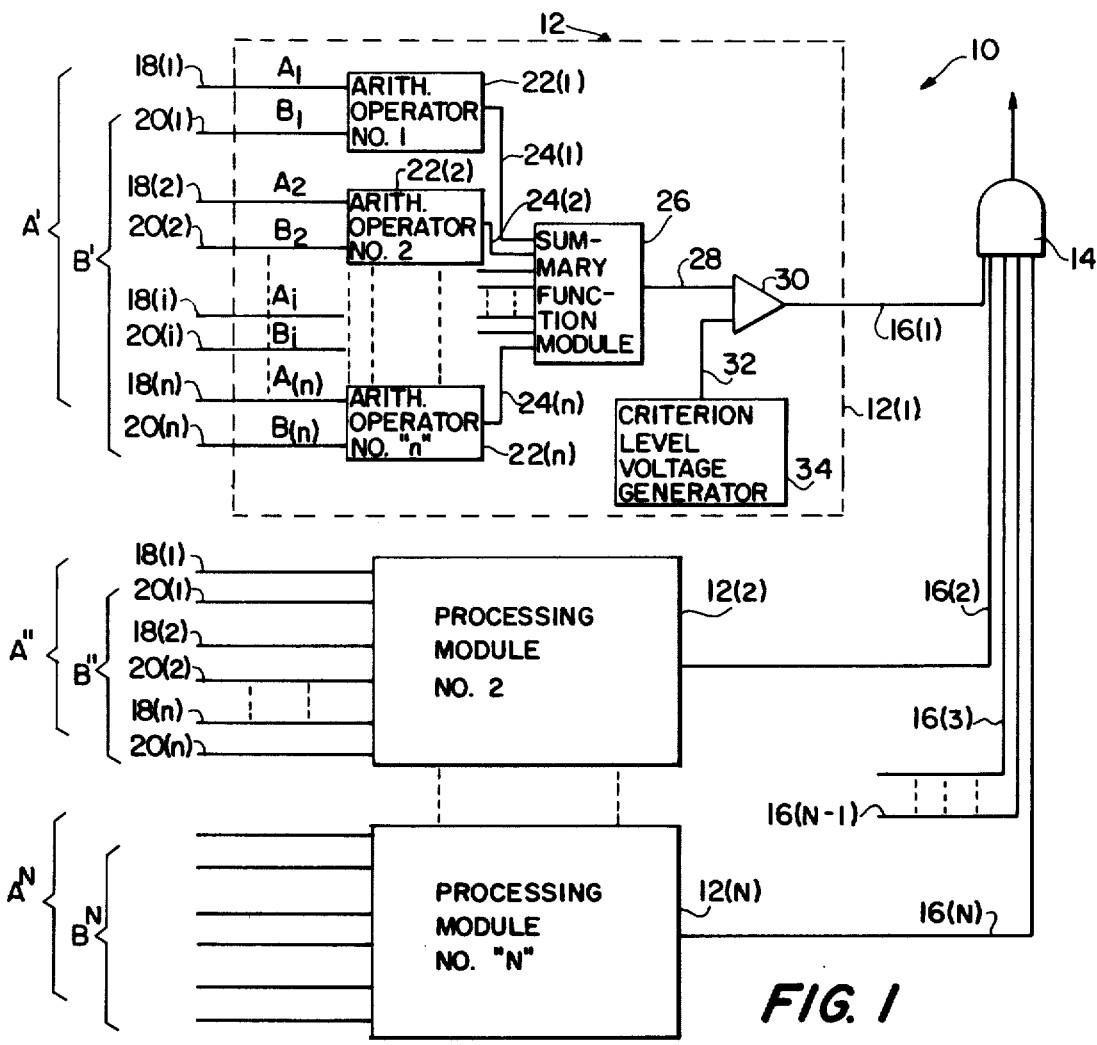
FIG. 1 is a schematic block diagram of a circuit element according to one embodiment of the invention.

Referring now to the figures wherein like components are depicted by like elements throughout the several figures, an evaluation circuit or basic element for evaluating the overall group similarity between a plurality of variable signals with a plurality of reference signals and for producing a signal based on the level of similarity of dissimilarity is depicted at 10. Evaluation circuit 10 includes the circuitry which is common to both the selection network and the memory network configurations of the present invention discussed hereinbelow. Evaluation circuit 10 is comprised of a plurality of identical processing modules 12, the outputs of which is always a binary "0" or a binary "1", and a logic gate 14 for receiving all of the outputs from the processing module in parallel and for producing a single output. In evaluation circuit 10 depicted in FIG. 1, there are "N" processing modules with modules 1, 2, and "N" being shown. The outputs from the "N" processing modules 12 are coupled through "N" lines 16 to the input of logic gate 14. Since positive logic is being used in evaluation circuit 10, logic gate 14 is an "AND" gate which produces an output only when all of the inputs from all "N" processing modules 12 are equal to a "1". In the present application, the "ith" component of "N" components will be referred to in parentheses following the numeral identifying the element. Thus, the first processing module will be indicated processing module 12(1) and the (N-1)th line 16 will be designated line 16(N-1). Other logic gates which could be used includes an "OR" gate, a "NAND" gate, a "NOR" gate, an exclusive "OR" gate and an exclusive "NOR" gate.

Each processing module 12 processes a plurality of value pairs or variable pairs $A_i$ and $B_i$ represented by analog voltage levels on corresponding input lines 18 and 20. Each value pair $A_i$ and $B_i$ is applied to a corresponding arithmetic operator 22 which outputs a voltage level that represents the degree of similarity between the two values. In the presently preferred embodiment of the invention, arithmetic operator 22 provides an output having a voltage level that is proportional to the absolute value of the difference between the inputted value pairs $A_i$ and $B_i$.

The output of each arithmetic operator 22 (i) is coupled through a line 24 (i) to the same summary function module 26. Summary function module 26 combines the individual pair evaluation signals according to a predetermined mathematical function and produces an output voltage on an output line 28 which reflects the overall group similarity between the set of A values and the set of B values. Output line 28 applies the variable output voltage signal from summary function module 26 to one input of a dual input comparitor 30. Comparitor 30 compares the group evaluation signal with a criterion voltage applied through a line 32 to the second input thereof and if the group evaluation signal voltage exceeds the criterion level voltage, comparitor 30 will output a binary "1" as the output from processing module 12, otherwise comparitor 30 will output a binary "0". The criterion voltage is supplied from a generator 34, which, in a perferred embodiment of the invention, can be established by a controlling processor or computer.

Evaluation circuit 10 is ideally suited to evaluate the overall similarity of a set of A values to a set of B values wherein each set is comprised of a plurality of groups signified by $A'$, $A''$, ... $A^N$ and $B'$, $B''$, ... $B^N$. As mentioned above, each group of values is comprised of "n" signals. Because a different criterion level voltage generator 34 (N) is used for each group, a changable criterion can be set for each group to signify that particular group's importance.

The embodiment of evaluation circuit 10 depicted in FIG. 1 processed analog values, which with the exception of the output from comparitor 30, used analog circuit elements. However, it should be obvious to one of ordinary skill in the art that other embodiments of the invention can use digital representation of values and conventional digital circuit elements to perform the same functions of the analog circuit elements described above. Thus, each signal could be represented by a digital signal expressed as a binary number and substantially the equivalent of the analog values described hereinabove. For example, in an eight bit word, any digital value from 0 through 255 could be represented on eight different input lines 18 to a single arthmetic operator 22 and compared with a similar digital representation on eight input lines 20.

Figure 2:
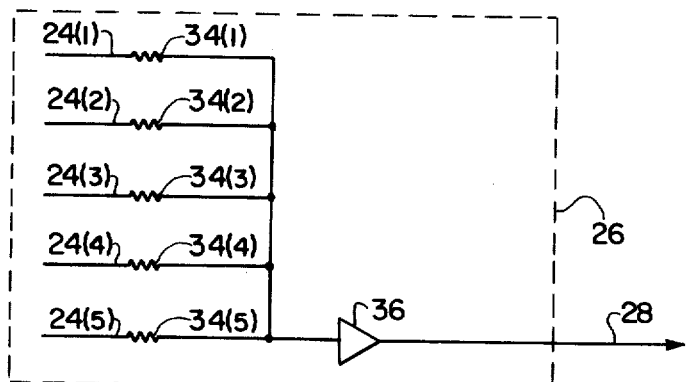
FIG. 2 is a detailed schematic circuit diagram of the summary function module depicted in FIG. 1.

A typical analog configuration for summary function module 26 is depicted in FIG. 2. Assuming there are five arithmetic operators 22, output lines from each arithmetic operator 22 (i) is indicated by lines 24 (1) to 24 (5) and each line applies the output from the corresponding arithmetic operator to a corresponding resistor 34 (i). Preferably, each resistor 34 (i) has the same resistance. The output from each resistor 34 (i) is applied to the input of a single amplifier 36 which can consist of any conventional, non-inverting transistor amplifier stage with sufficient gain and a low input impedance relative to resistors 34. The output of amplifier 36 on line 28 is a voltage level reflecting the simple summation of the individual arithmetic operator outputs such that the aggregate similarity of the $A_i$ and $B_i$ input values is reflected by a positive voltage level. It is noted that numerous other circuit configurations for summary function module 26 are obvious to those of ordinary skill in the art.

Figure 3:
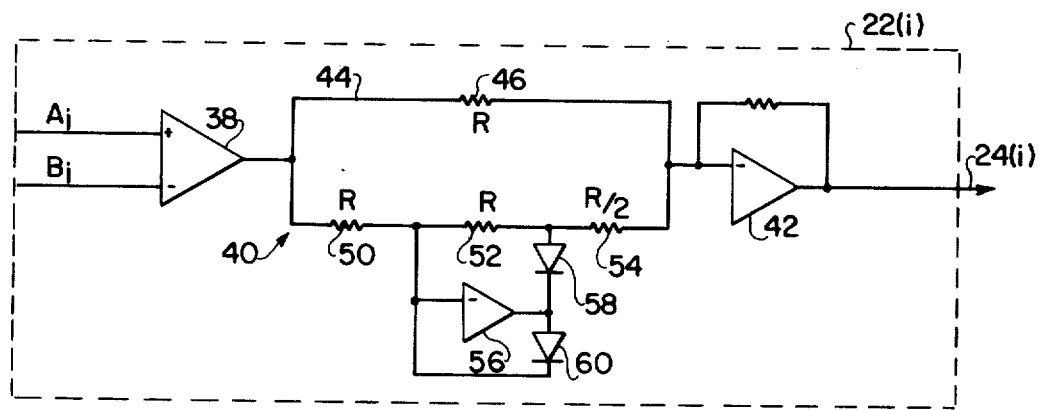
FIG. 3 is a detailed schematic circuit diagram of one of the arithmetic operators depicted in FIG. 1.

A presently preferred circuit diagram of arithmetic operator 22 is depicted in greater detail in FIG. 3. The individual voltage levels $A_i$ and $B_i$ are applied via lines 18 (i) and 20 (i) to a differential amplifier 38 which can be any conventional type. The output of differential amplifier 38, which is a positive or negative voltage level reflecting the difference between the $A_i$ and $B_i$ inputs is applied to a network 40, the output of which is always equal to the negative value of the absolute difference between inputs $A_i$ and $B_i$. The output from network 40 is supplied to an output buffer/inverter 42 which provides inversion of the negative voltage input at a unity gain. Consequently, the output of arithmetic operator 22 (i) is equal to the absolute value of the arithmetic difference between the voltage levels of signals $A_i$ and $B_i$ input values.

Network 40 is comprised of an upper leg 44 having a single resistor 46 with a resistance of "R" and a lower leg 48 which has three resistors 50 and 52 having a resistance of "R" and 54 having a resistance of "R/2". An inverting amplifier 56 of unity gain has its negative input connected to the junction between resistors 50 and 52 and its outputs connected via a reverse biased diode 58 to the junction between resistors 52 and 54. Feedback from amplifier 56 is provided through a forward biased diode 60. If the difference value output from amplifier 38 is a negative voltage $-E$, the voltage is passed through resistor 46 and applied directly to output buffer/inverter 42. Amplifier 56 is prevented from responding to this negative input by feedback through diode 60 which limits the amplifier output to a value slightly higher than 0. If the output of amplifier 38 is a positive value $+E$, amplifier 56 is properly biased and delivers a voltage of $-E$ to the junction between resistors 52 and 54. Since this same voltage is delivered to the forward side of resistor 52, the net voltage result at the junction between resistors 52 and 54 is a voltage of $-2E$ being applied to resistor 54. Because the output of amplifier 38, $+E$ volts, is applied through resistor 46, the net result of the two legs 44 and 48 will be a voltage of $E-2E$, which equals $-E$, being applied to the input of amplifier 42. Amplifiers 42 and 56 can be of any common amplifier type having sufficient excess gain to permit the final gain to be determined by negative feedback.

Figure 4:
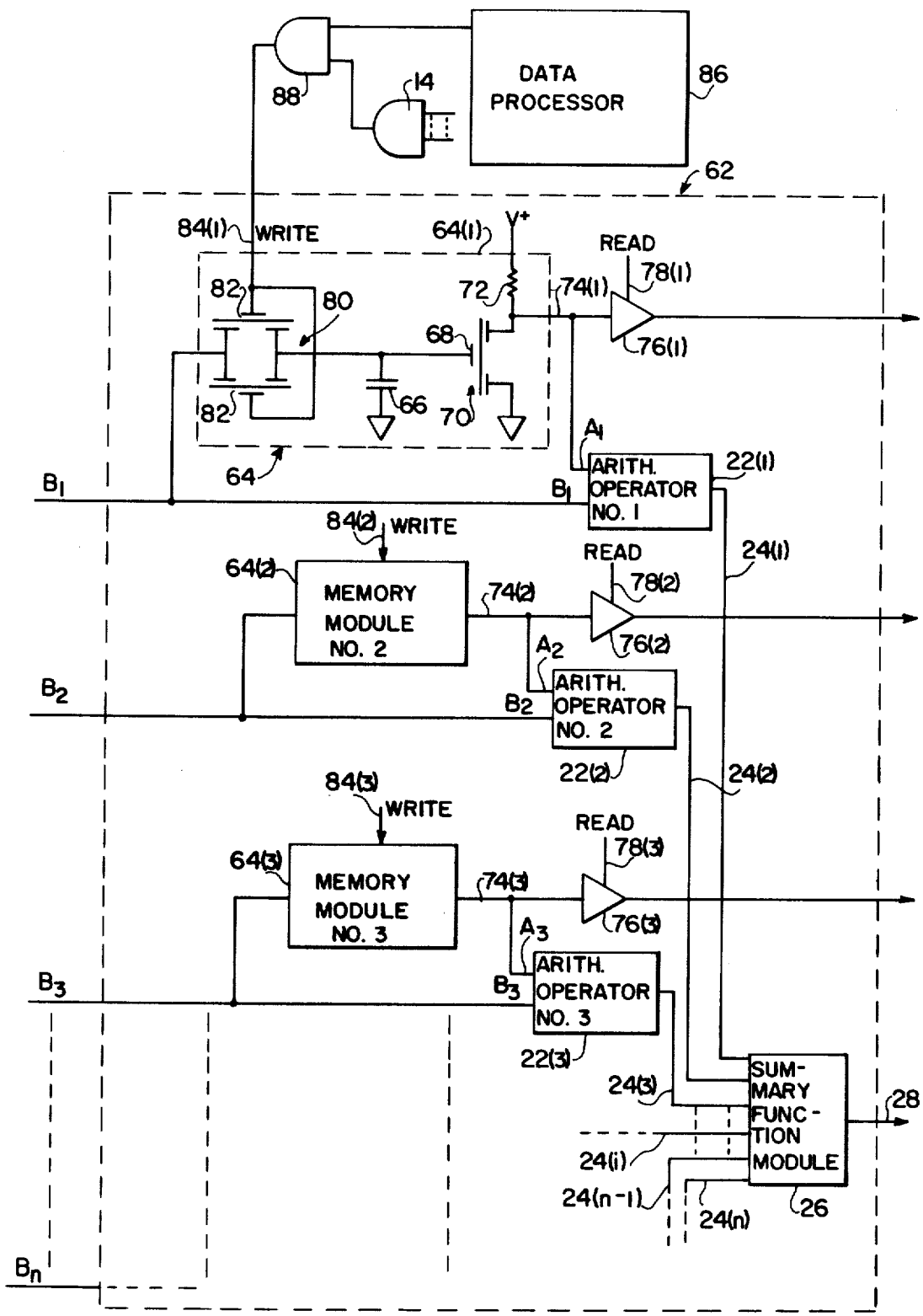
FIG. 4 is a detailed schematic circuit diagram of an application of the basic circuit element depicted in FIG. 1 used to control the storage of an incoming signal which is then used as a comparison signal for subsequent incoming signals.

With reference to FIG. 4, the complete configuration for a memory network circuit element 62 for providing a means of memory storage and output is depicted. In comparison with processing module 12, memory network circuit element 62 comprises a means for inputting and/or storing an input signal $B_i$ and a means for comparing a previously stored signal $A_i$ with an inputted signal $B_i$ in an arithmetic operator 22 (i) and then summing the outputs on lines 24 (i) in a summary function module 26. Dual input comparitor 30 present in processing module 12 is not included in the present memory circuit element 62. With that exception and the addition of "n" memory modules, processing module 12 and memory circuit element 62 are the same.

Since all memory modules 64 (i) are the same, only memory module 64 (1) will be discussed. In the presently preferred example, the $A_i$ input value is derived from a memory storage element 66, which may be a capacitor, another element capable of charge storage, or any other means of level or multistage storage. The voltage level stored by memory storage element 66 provides a controlling electrical voltage across the gate 68 of MOS transistor 70. Current flow through transistor 70 establishes a voltage across resistor 72 connected on one end to the source of transistor 70 and to a supply voltage $V+$ on the other side. The output from memory module 64 is taken by line 74 at the junction between resistor 72 and the source of transistor 70. Output line 74 divides into two parts, one part feeding the input of a bus buffer 76 (which can be any common buffer amplifier presenting a high output impedance when disabled) having a read enable line 78, and the other part going to the $A_1$ input of arithmetic operator 22(1).

Memory storage element 66 can be charged and discharged to the level of various B input values through a high-impedance bilateral switch 80. Switch 80 can be comprised of, for example, a pair of MOS transistors 82 or can be comprised of any other means of high-impedance switching or charge tunneling. Switch 80 is activated by applying a signal to write line 84 (1). The write signal can be generated by logically ANDing a WRITE signal from a controlling data processor 86 and the output of logic gate 14 (also depicted in FIG. 1) through AND gate 88. The assertion by memory circuit element 10 of its selection signal (output of gate 14) based on the similarity of the $B_i$ input values to the memory contents is thus the basis for storage of new values in the memory storage elements 66. This provides a form of "addressing". This same type of associative addressing operation provides the basis for output of memory contents through bus buffer 76.

Figure 5:
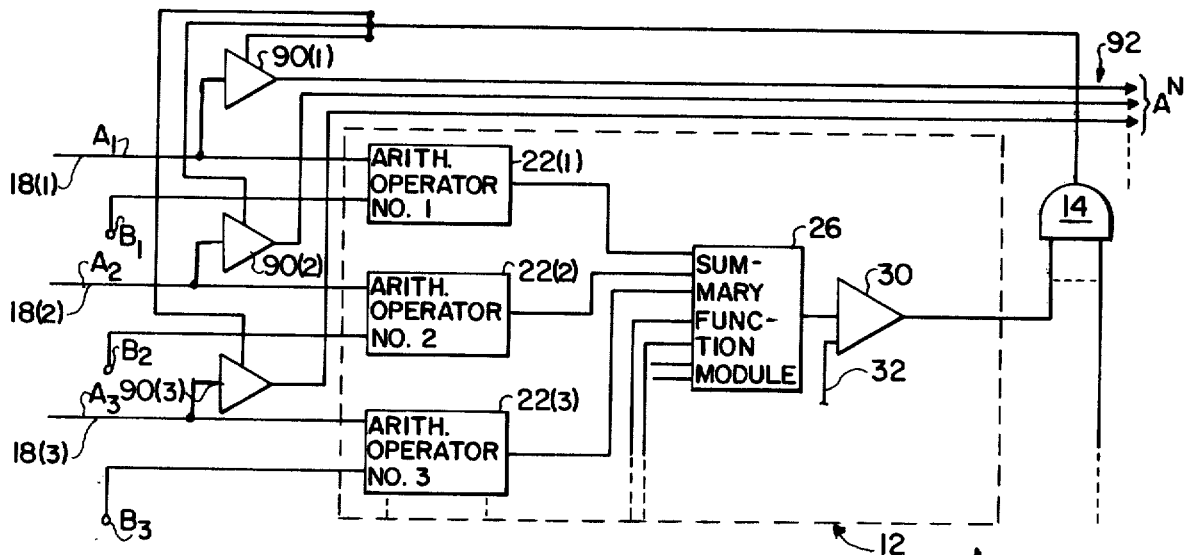
FIG. 5 is a schematic circuit diagram of another application of the basic circuit element used to control the outputting of an incoming signal based on a successful comparison.

A second configuration for evaluation circuit 10 is depicted in FIG. 5 wherein the circuit is used to perform data screening or selection rather than for memory functions as discussed above with respect to FIG. 4. The configuration of FIG. 5 comprises evaluation circuit 10 with its processing modules 12 and the signal logic gate 14. The output of logic gate 14 is coupled to enable line of each one of n bus buffers 90. The plurality of input values $A_i$ are coupled through input lines 18 to the inputs of the corresponding bus buffer 90 and arithmetic operator 22. The second input to arithmetic operator 22 (i), namely $B_i$ is preferably supplied in this embodiment from a controlling data processor (not shown). Thus, the group of values of group $A^N$ are outputted at 92 when evaluation circuit 10 has favorably compared these inputs to a group of predetermined values $B^N$. Evaluation circuit 10 operates as described hereinabove.

Figure 6:
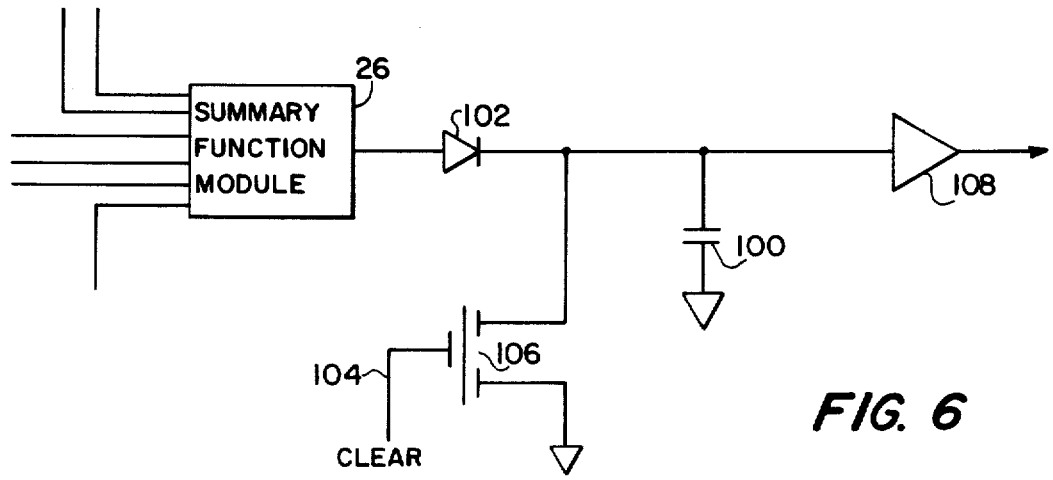
FIG. 6 is a schematic circuit diagram of a second embodiment of the present invention in which the highest level attained by sequential outputs from the summary function module is stored in a memory cell.

A further modification of evaluation circuit 10 is depicted in FIG. 6 in which a memory element, similar to that described above with respect to FIG. 4, is permitted to evaluate a set of variable groups that are applied sequentially in time rather than simultaneously. The modification depicted in FIG. 6 consists of a capacitor 100 or other comparable means of charge storage, which is charged to the highest level output by the summary function module 26 through a diode 102. The voltage level on capacitor 100 remains until cleared by a CLEAR signal applied through input line 104 to the gate of a transistor switch 106, thereby discharging capacitor 100 to ground. The voltage stored on capacitor 100 is outputted by the operation of an output buffer 108.

As stated above, circuit 10 can be comprised of all digital components used to compare and process all digital signals. The substitution of known digital circuits having the same function of the depicted analog components would be obvious to one of ordinary skill in the art. For example, one or more 7485 (4 bit magnitude comparitor) bipolar integrated circuit chips (IC) can perform the function of comparitor 30 or bit by bit comparison can be done by using common exclusive NOR gates such as 745135 (Schotky exclusive OR/NOR gates); one or more 7483 (4 bit binary adder) IC's can perform the function of summary function module 26; and the function of arithmetic operators 22 can be performed by appropriate digital logic which can include, for example, one or more 74181 (arithmetic logic unit) IC's to perform the subtraction and other logic IC's to take the absolute value. Alternative, the present invention could be practiced by a properly programmed general purpose digital computer or by a special computer. Because the basic evaluation circuit is used in a plurality of applications, it could easily be incorporated into a special purpose integrated circuit chip.

Although the invention has been described in detail with respect to exemplary embodiments thereof, it will be understood by those of ordinary skill in the art that variations and modifications may be effected within the scope and spirit of the invention.

I claim:

1. A circuit useful for evaluating the overall group similarity between a first group of "n" first signals with a second group of "n" second signals and for producing a signal based on the level of similarity or dissimilarity of the groups, said circuit comprising an evaluator comprising:

"n" first input means for inputting corresponding first signals;

"n" second input means for inputting corresponding second signals;

"n" operator means, each respectively coupled to one said first input means and to one said second input means, each operator means for quantitatively comparing the first signal with the second signals and outputting a signal result reflective of said comparison;

a summary function means coupled to the output of said "n" operator means for receiving the "n" said comparison results and for producing an output signal that corresponds to a weighted summary of said comparison results; and comparitor means for comparing the magnitude of said summary function output signal with the magnitude of a criterion signal, said magnitude of which depends upon the desired degree of similarity, said comparitor means outputting a digital output signal whose value is based on whether, and denoted "true" when, the magnitude of said summary function output signal is greater than the magnitude of said criterion signal;

wherein "n" equals a positive integer greater than 1.

2. A circuit as claimed in claim 1 wherein the weight of each comparison result is one and said weighted summary is an arithmetical summation of the magnitude of said comparison results.

3. A circuit as claimed in claim 1 wherein said comparitor means outputs a one bit binary signal.

4. A circuit as claimed in claim 1 wherein the output of each said operator means equals the absolute value of the algebraic difference between the first signal and the second signal.

5. A circuit as claimed in claim 1 wherein said first signals and said second signals are analog signals.

6. A circuit as claimed in claim 5 wherein said operator means outputs a signal the voltage of which equals the absolute value of the algebraic difference between the voltages of the first signal and the second signal and said summary function means outputs a signal the voltage of which equals a weighted summary of said outputs from said operator means.

7. A circuit as claimed in claim 1 and further comprising a second evaluator, the comparitor means of which outputs a second digital output signal, and logic means for receiving said first and second digital output signals and in turn outputting a digital signal based on a predetermined relationship between said first and second digital output signals.

8. A circuit as claimed in claim 7 wherein said logic means is a logic gate which outputs a binary signal.

9. A circuit as claimed in claim 8 wherein said logic gate is an "AND" gate having at least as many inputs as there are evaluators.

10. A circuit as claimed in claim 7 and further including a data processor for generating said criterion signals.

11. A circuit as claimed in claim 7 and further including a signal storage means for storing said first signals, the output of said storage means being coupled to said first input means.

12. A circuit as claimed in claim 11 and further including a switch means for coupling, when activated, said second signal to said storage means for the storing thereof, said switch means being activated by a signal comprising the output from said logic means.

13. A circuit as claimed in claim 12 and further including a data processor for generating a write signal and said criterion signals; and a further logic means receiving said write signal and said output from said logic means and outputting a signal which activates said switch means when activated by said logic means output and said write signal.

14. A circuit as claimed in claim 7 and further comprising a switch means when activated for outputting from said circuit said first group of first signals, and wherein the output from said logic means activates said switch means.

15. A circuit useful for evaluating the overall group similarity between a first group of "n" first signals with a second group of "n" second signals and for producing a signal based on the level of similarity or dissimilarity of the groups, said circuit comprising an evaluator comprising:

"n" first input means for inputting corresponding first signals;

"n" second input means for inputting corresponding second signals;

"n" operator means, each respectively coupled to one said first input means and to one said second input means, each operator means for comparing the first signal with the second signals and outputting the result of said comparison;

a summary function means coupled to the output of said "n" operator means for receiving the "n" said comparison results and for producing an output signal that corresponds to a weighted summary of said comparison results; and comparitor means for comparing the magnitude of said summary function output signal with the magnitude of a criterion signal, said magnitude of which depends upon the desired degree of similarity, said comparitor means outputting a digital output signal whose value is based on whether the magnitude of said summary function output signal is greater than the magnitude of said criterion signal storage means for receiving and storing the output from said summary function module.

16. A circuit as claimed in claim 15 and further comprising first switch means when activated for clearing the contents of said storage means and second switch means when activated for outputting the stored contents of said storage means.

17. A circuit as claimed in claim 15 wherein said first and second signals are analog signals and said storage device is a capacitor.

18. A method for evaluating the overall group similarity between a first group of "n" first signals with a second group of corresponding "n" second signals and for producing a signal based on the level of similarity or dissimilarity of the groups, the method comprising:

inputting "n" first signals to "n" operator means;

inputting "n" second signals to the corresponding ones of said "n" operator means;

comparing each of the first signals with the corresponding ones of the second signals in said operator means and outputting the result of said comparison;

producing an output signal that corresponds to a weighted summary of the comparison results in a summary function means; and comparing the magnitude of said summary function output signal with the magnitude of a criterion signal, said magnitude of which depends upon the desired degree of similarity, and outputting a digital output signal whose value is based on whether the magnitude of said summary function output signal is greater than the magnitude of said criterion signal;

wherein "n" equals a positive integer greater than 1.

* * * * *